United States Patent [19]
Popeck

[11] Patent Number: 5,940,026
[45] Date of Patent: Aug. 17, 1999

[54] AZIMUTH DETERMINATION FOR GPS/INS SYSTEMS VIA GPS NULL STEERING ANTENNA

[75] Inventor: Charles A. Popeck, Cedar Rapids, Iowa

[73] Assignee: Rockwell Science Center, Inc., Thousand Oaks, Calif.

[21] Appl. No.: 08/897,915

[22] Filed: Jul. 21, 1997

[51] Int. Cl.[6] .................................................. G01S 5/02
[52] U.S. Cl. ............................. 342/357.01; 342/357.05; 342/357.11; 342/357.12
[58] Field of Search .................... 342/352, 451, 342/140, 357.01, 357.06, 357.11, 357.12; 701/213

[56] References Cited

U.S. PATENT DOCUMENTS

| | | |
|---|---|---|
| 3,680,124 | 7/1972 | Stone et al. ........................ 343/113 R |
| 5,185,610 | 2/1993 | Ward et al. .............................. 342/357 |
| 5,296,861 | 3/1994 | Knight ...................................... 342/357 |
| 5,539,408 | 7/1996 | Moreira et al. ........................... 342/25 |

*Primary Examiner*—Thomas Tarcza
*Assistant Examiner*—Dao L. Phan
*Attorney, Agent, or Firm*—Kyle Eppele; James P. O'Shaughnessy

[57] ABSTRACT

Illustrative embodiments of a method and apparatus are provided for determining azimuth for a system using signals from a constellation of satellites of the global navigation satellite system. The method includes the steps of identifying a direction of a selected satellite of the constellation of satellites and determining a azimuth by correlating the identified direction of the selected satellite with the location of the system.

32 Claims, 4 Drawing Sheets

AZIMUTH DETERMINATION FOR GPS/INS SYSTEMS VIA GPS NULL STEERING ANTENNA

FIELD OF THE INVENTION

The field of the invention relates to inertial navigation systems and more particularly to inertial navigation systems using the global positioning system.

BACKGROUND OF THE INVENTION

Global navigation satellite systems (GNSS), such as the American NAVSTAR GPS and Russian GLONASS, are known. The NAVSTAR GPS developed by the U.S. Defense Department is a satellite-based radio navigation system which transmits information from which extremely accurate navigational calculations can be made in three-dimensional space anywhere on or near the Earth. Three-dimensional velocity can be determined with equal precision. The GPS uses 24 satellites dispersed in six, inclined, 12 hour circular orbits chosen to insure continuous 24 hour coverage worldwide. Each satellite uses extremely accurate cesium and rubidium vapor atomic clocks for generating a time base. Each satellite is provided with clock correction and orbit information by Earth-based monitoring stations.

Each satellite transmits a pair of L-band signals. The pair of signals includes an L1 signal at a frequency of 1575.42 MHZ and an L2 signal at a frequency of 1227.6 MHZ. The L1 and L2 signals are bi-phase modulated by pseudo-random noise (PRN) codes and an information signal (i.e., navigational data) encoded at 50 Hz. The PRN codes facilitate multiple access through the use of a different PRN code by each satellite.

Upon detecting and synchronizing with a PRN coded signal, a receiver decodes the signal to recover the navigational data, including emphemeris data. The emphemeris data is used in conjunction with a set of Kepler equations to precisely determine the location of each satellite. The receiver measures a phase difference (e.g., time of arrival) of signals from at least four satellites. The time differences are then used to solve a matrix of four equations to provide a space and time solution. The result is a precise determination of location of the receiver in three-dimensional space.

The velocity of the receiver may be determined by a precise measurement of the L1 and L2 frequencies. The measured frequencies are used to determine Doppler frequency shifts for each satellite. The measured differences are used to solve another set of equations to determine a velocity of the receiver relative to the Earth based upon the detected phase shift of the received signals.

Integrated GPS/INS systems require an initialization of system attitude (i.e., orientation relative to the Earth) in terms of roll, pitch and azimuth. The INS portion of a GPS/INS system typically performs a self-determination of roll and pitch through internally sensed acceleration. In high quality INS systems, azimuth is determined by sensing the horizontal component of the Earth's rotation rate, which provides an indication of North. This technique is not available to less sophisticated (less accurate) GPS/INS systems, often requiring that an external source provide azimuth initialization (e.g., an operator periodically orienting the INS system towards a northerly direction using a compass and activating an azimuth initialization button). Accordingly, a need exists for a method of determining azimuth that does not depend upon high quality accelerometers or gyroscopes.

SUMMARY

Illustrative embodiments of a method and apparatus are provided for determining azimuth for a system using signals from a constellation of satellites of the global navigation satellite system. The method includes the steps of identifying a direction of a selected satellite of the constellation of satellites and determining a azimuth by correlating the identified direction of the selected satellite with the location of the system.

DETAILED DESCRIPTION OF THE INVENTION

Figure 1:
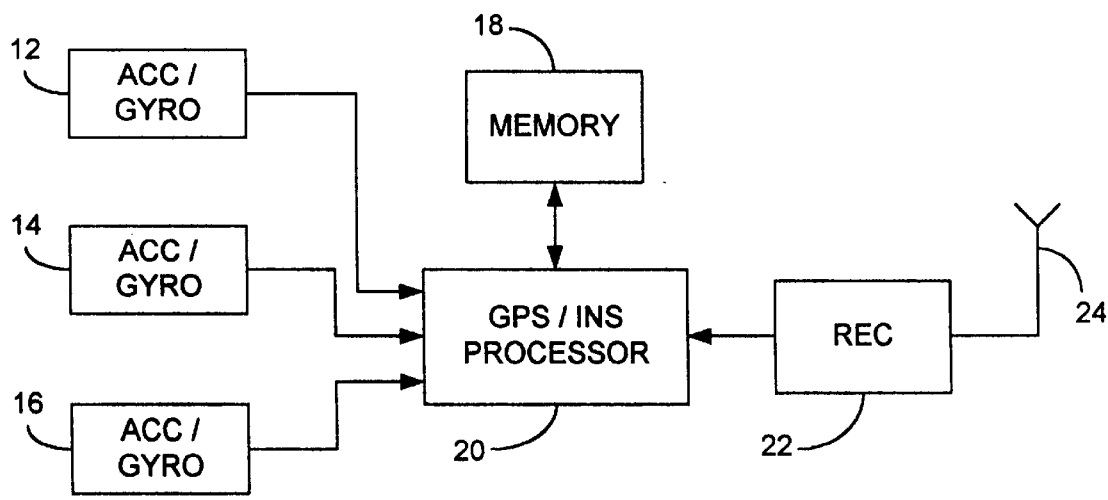
FIG. 1 is a block diagram of a GPS/INS in accordance with an embodiment of the invention.

FIG. 1 is a block diagram of a global navigation satellite system/inertial navigation system (GPS/INS system) 10, generally, in accordance with an embodiment of the invention. As used herein the term "GPS" or "GPS/INS" will be assumed to include systems operating under the NAVSTAR GPS or GLONASS.

Under the embodiment, the system 10 determines azimuth by correlating a direction of a selected satellite of the GPS with its own location. The system 10 determines the direction of the selected satellite from signal emanating from the satellite.

Under the embodiment, a GPS/INS processor 20 first determines a location of the system 10 using known GPS processes. After determining an initial position and velocity, the system relies upon a set of mutually orthogonal accelerometers/gyroscopes 12, 14, 16 for navigational data during time intervals between GPS determinations. After the initial determination of position and velocity, the GPS portion of the system 10 periodically re-determines position and velocity as a means of correcting for cumulative errors in the INS portion of the system 10.

The GPS portion of the GPS/INS system 10 includes the processor 20, memory 18, receiver 22 and antenna 24. The INS portion of the GPS/INS system 10 includes the processor 20, the memory 18 and the three accelerometers/gyroscopes 12, 14, 16.

Upon start-up, the system 10 first begins by searching for a GPS satellite (not shown) on the L1 and L2 channels. Upon detecting a satellite, the system 10 acquires the signal by synchronizing (cross-correlating) a copy of the PRN code generated in receiver 22 with an encoded signal received on the L1 and L2 channels.

Upon synchronizing to the signal, the GPS portion begins decoding the 50 Hz navigational data superimposed on the PRN encoded signal of the L1 and L2 channels. From the navigational data, the GPS processor 20 recovers the emphemeris data including the Keplerian orbit parameter terms for the satellite. From the Keplerian orbit parameter terms, the processor 20 is able to determine the precise location of the satellite by solving a set of Keplerian orbit equations. In other systems (e.g., GLONASS), the processor may determine location using a set of Earth Centered, Earth Fixed (ECEF) coordinates.

Also from the navigational data, the processor 20 recovers almanac data for other satellites in the area of the satellite first detected. From the almanac data, the processor 20 is able to quickly detect and synchronize with at least three more satellites. Through use of the emphemeris data for those satellites and the Keplerian equations, the processor determines the position of the three additional satellites.

With the position of at least four satellites in its possession, the processor 20 now measures differences in arrival time of each signal from each of the four satellites. The locations and time of arrival of signals from the four satellites now allow the processor 20 to form its navigation and time solution. The navigation solution precisely specifies the location of the system 10 in three-dimensional space.

The processor 20 measures frequency offsets of each of the four acquired signals on the L1, L2 channels to determine a Doppler frequency shift caused by differences in velocity between each of the satellites and the system 10. Upon determining differences for each of the satellites, the processor 20 then solves a set of velocity equations to determine a velocity of the system 10 in three-dimensional space.

Under the embodiment, the INS portion of the system 10 forms a complementary adjunct to operation of the GPS portion. During normal use of the system 10, the system 10 is often in areas where the GPS portion cannot acquire and decode GPS satellite signals. While the system 10 is in those areas where it cannot decode GPS signals, the INS portion provides continuity of operation (positional and velocity information) until GPS signals can again be acquired.

To provide positional information, the INS portion must first be initialized. To initialize the INS portion, the processor 20 determines roll, pitch and azimuth. Under the embodiment, the processor 20 may determine roll and pitch conventionally through use of the accelerometers/gyroscopes 12, 14, 16.

In one embodiment, azimuth may be determined by selecting one of the four acquired satellites and steering a null towards the selected satellite. Determination of when the null is directed towards the selected satellite is made based upon identification of a relative minima in the detected signal received from the selected satellite. The azimuth of the system 10 may then be correlated with the direction of the steered null. To correlate the system 10, the azimuth of the system 10 at the steered null of the minima may be made equal to the azimuth of an arbitrary body located at the GPS determined position of the device 10 looking at a satellite in the position determined above using the Keplerian equations.

Figure 2:
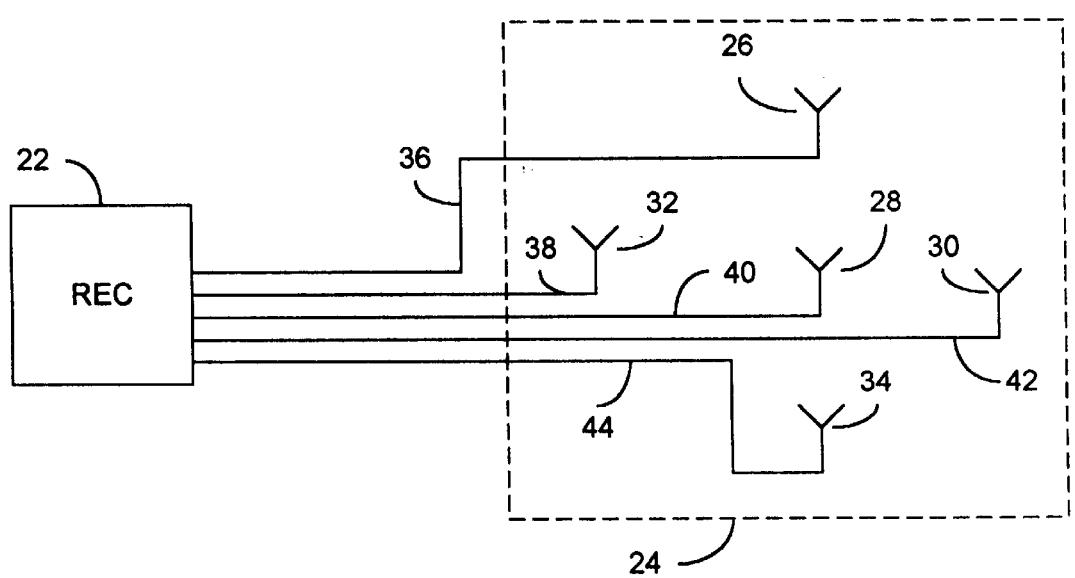
FIG. 2 is a block diagram of an illustrative embodiment of an antenna and receiver of the system of FIG. 1.

FIG. 2 depicts an illustrative example of a layout of the antenna 24 under an embodiment of the invention. Under the embodiment, the antenna 24 has a first set of array elements 32, 28, 30 directed along a first axis and a second set of elements 26, 28, 34 directed along a second axis.

Assuming that each element 26, 28, 30, 32, 34 is similar, the phase of the signal received by each element is assumed dependent only upon a time of arrival relative to the other elements. Although amplitude variations in received signals may or may not be introduced for minimum side lobes in the illustrative embodiment of FIG. 2, each voltage En received by each element is considered separately.

Figure 3:
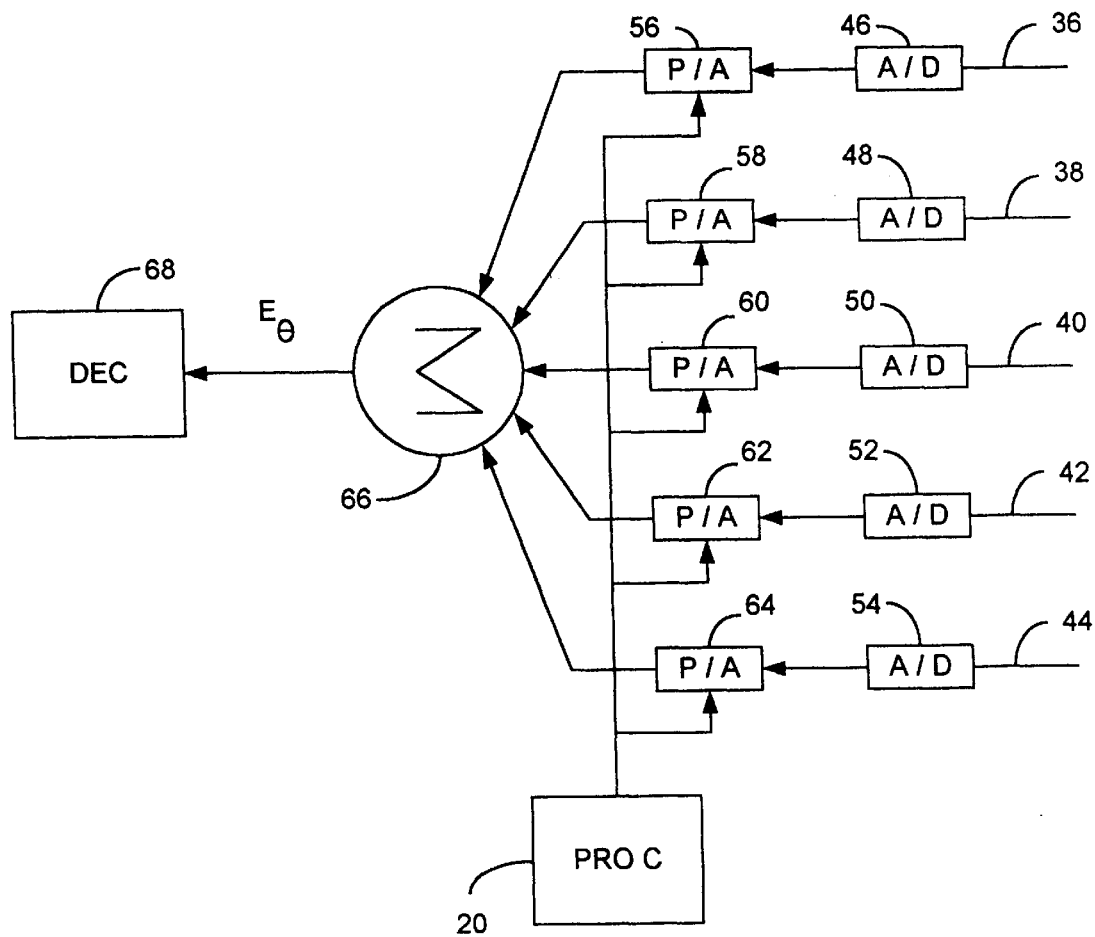
FIG. 3 is a block diagram of illustrative embodiment of signal processing apparatus located within the receiver of FIG. 1.

Within the embodiment of receiver 22 of FIG. 3, the output of each element is summed within a summer 66 to produce a composite signal which becomes an input to a decoder 68. Null steering is accomplished by a set of phase or amplitude adjusters 56, 58, 60, 62, 64 under control of the processor 20. The composite signal $E_\theta$ provided by the summer 66 to the decoder 68 is the sum of the signals received on each antenna element and phase or amplitude shifted in the P/A adjusters 56, 58, 60, 62, 64. The composite signal E. may be described by the expression:

$$E_\theta = \Sigma E_n \cos [\overline{\omega} t + n(\Phi - d \sin \theta)],$$

where Eθ is the total composite signal received from a direction θ, $E_n$ is a signal amplitude received on antenna element n, d is the spacing between antenna elements in radians of a wavelength, θ is a direction of reception, and φ is phase shift introduced into a signal received from a particular antenna element.

To steer a null, a variable phase shift φ is used for each steered angle of the steered null. For the P/A shifters 56, 58, 60, 62, 64 of FIG. 3, the phase shift value $B_n$ for each shifter becomes a function of array position, with the actual value defined by the equality $B_n = n\phi$.

For example, if the steered angle of the antenna array of FIG. 2 were to proceed horizontally from right to left then the left element 32 would be designated element 1 and would have a phase shift of φ. The second element 28 would be designated the element 2 and have a phase shift of 2φ, and the third element 30 would have a phase shift of 3φ.

The phase shift could have a value of anywhere between πD/λ (where D is antenna element spacing and λ is wavelength) and a phase value of zero. The incremental steered angle would depend upon the required accuracy of the azimuth determination.

Under one embodiment, to measure azimuth, the processor 20 acquires the L1, L2 signal of the selected satellite. The system 10 may first steer the null horizontally using the horizontal antenna elements 32, 28, 30. The processor may select a series of 10 incremental steered steps for the sweep (i.e., Δφ=πD/(10λ)). To prevent interference in signal measurements from the vertical elements 26, 34 during the horizontal sweep, the processor may set the shift angle on the vertical array elements 26, 34 to a very high value.

At each measurement of the steered null, the processor 20 measures a signal strength from the selected satellite. The processor may do this, for example, by a direct signal strength measurement or by measuring a bit error rate (BER).

At each measuring position, the processor 20 in one embodiment stores the steered angle and signal strength in a signal measurement table in memory 18. After each measurement, the processor 20 of the illustrated embodiment increments the steered angle and takes a new measurement. After completing a sweep, the processor 20 of the illustrated embodiment compares the measured values, determines a relative minima and selects the associated steering angle as a first approximation of azimuth.

Following a horizontal sweep using the horizontal antenna elements 32, 28, 30, the processor 20 may perform a vertical sweep using the vertical antenna elements 26, 28, 34 using the same process. Following the second sweep, the processor 20 may determine a final azimuth value be extrapolating between horizontal and vertical values.

Figure 4:
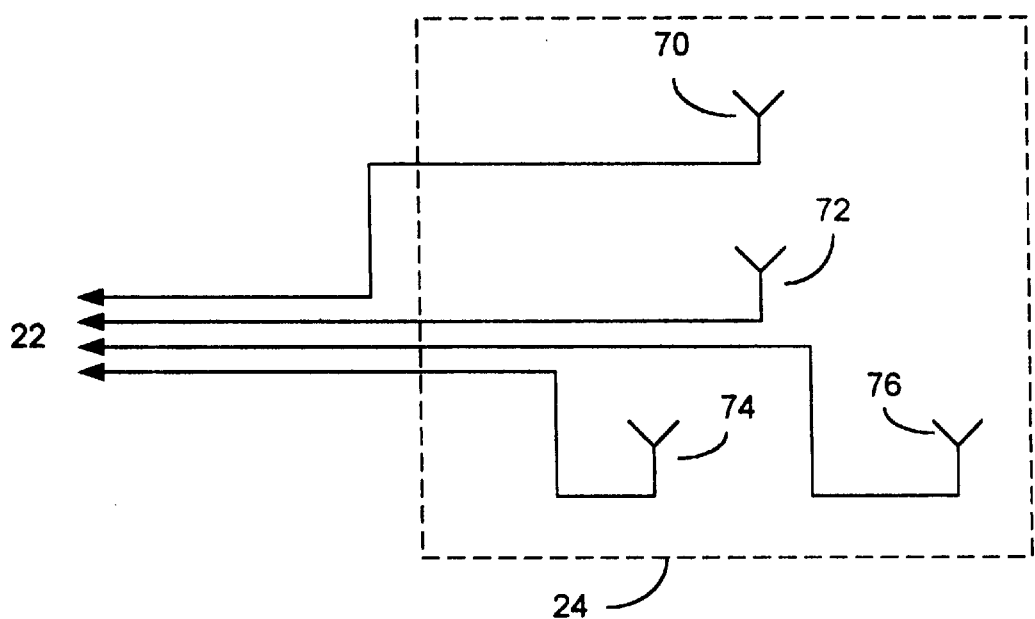
FIG. 4 depicts an example an antenna of FIG. 1 under an alternate embodiment of the invention.

In another embodiment of the invention (FIG. 4), the antenna array 24 may be comprised of four elements, with a single element 72 in the center and three elements 70, 74, 76 surrounding the center element 72. Under the embodiment, any one of three pairs of elements 70, 72; 72, 74; 72, 76 may be used to steer a null along an axis spaced 120° from any other axis. As above, a table of signal value readings are created for each steered null position for each 120° ray. The relative minima of each table is selected and the steered angle of the relative minima is used to triangulate the position of the satellite relative to the GPS/INS system 12. The triangulated null position is then made equal to the azimuth of a body in the GPS calculated position observing a satellite in the position calculated using the Keplerian equations.

A specific embodiment of a method and apparatus of determining azimuth in a low-cost GPS system according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of determining azimuth within an inertial navigation system using signals from a constellation of satellites of the global navigation satellite system where each satellite of the constellation of satellites provides positional information of the satellite, such method comprising the steps of:

acquiring a signal from at least some satellites of the constellation of satellites;

determining a location of the inertial navigation system from the acquired signals;

steering a null across a selected arc containing a selected satellite of the at least some satellites from which signals were acquired;

identifying a direction of the selected arc providing a relative minima in signal level from the selected satellite in response to the steered null; and determining a azimuth by correlating the identified direction of the relative minima with an azimuth of the selected satellite from a perspective of the determined location.

2. The method of determining azimuth as in claim 1 further comprising decoding almanac/ephemeris data from each acquired satellite signal as provided satellite positional information.

3. The method of determining azimuth as in claim 1 wherein the step of acquiring a signal further comprises synchronizing a chip sequence of the inertial navigation system with a chip sequence from the at least some satellites.

4. The method of determining azimuth as in claim 1 wherein the step of determining location further comprises decoding navigational data from the acquired signal.

5. The method of determining azimuth as in claim 4 further comprising recovering emphemeris data from the navigational data.

6. The method of determining azimuth as in claim 5 further comprising determining a satellite position based upon the emphemeris data and a set of Keplerian equations or ECEF coordinates.

7. The method of determining azimuth as in claim 1 wherein the step of steering a null further comprises adding delay to signal values received from at least some elements of an antenna array of the inertial navigation system.

8. The method of determining azimuth as in claim 7 wherein the step of adding delay to signal values further comprising adding an incremental delay to signal values from antenna elements along a first axis of the antenna array.

9. The method of determining azimuth as in claim 7 wherein the step of adding delay to signal values further comprising adding an incremental delay to signal values from antenna elements along a second axis of the antenna array.

10. The method of determining azimuth as in claim 7 further comprising summing signal values at each steered null position and storing the sum in a signal value table along with indicia of the steered null direction.

11. The method of determining azimuth as in claim 10 further comprising comparing sums in the signal value table to determine a steered null direction providing the relative minima in signal level.

12. The method of determining azimuth as in claim 11 wherein the step of determining an azimuth by correlating the identified direction of the relative minima with the provided satellite positional information further comprises setting the direction of the steered null at the relative minima equal to the azimuth of the selected satellite as measured from the determined location.

13. Apparatus for determining azimuth within an inertial navigation system using signals from a constellation of satellites of the global position system where each satellite of the constellation of satellites provides positional information of the satellite, such apparatus comprising:

means for acquiring a signal from at least some satellites of the GPS system;

means for determining a location of the inertial navigation system from the acquired signals;

means for steering a null across a selected arc containing a selected satellite of the at least some satellites from which signals were acquired;

means for identifying a direction of the selected arc providing a relative minima in signal level from the selected satellite in response to the steered null; and means for determining a azimuth by correlating the identified direction of the relative minima with an azimuth of the selected satellite from a perspective of the determined location.

14. The apparatus for determining azimuth as in claim 13 further comprising means for decoding almanac/ephemeris data from each acquired satellite signal as provided satellite positional information.

15. The apparatus for determining azimuth as in claim 13 wherein the means for acquiring a signal further comprises means for synchronizing a chip sequence of the inertial navigation system with a chip sequence from the at least some satellites.

16. The apparatus for determining azimuth as in claim 13 wherein the means for determining location further comprises means for decoding navigational data from the acquired signal.

17. The apparatus for determining azimuth as in claim 16 further comprising means for recovering emphemeris data from the navigational data.

18. The apparatus for determining azimuth as in claim 17 further comprising means for determining a satellite position based upon the emphemeris data and a set of Keplerian equations.

19. The apparatus for determining azimuth as in claim 13 wherein the means for steering a null further comprising means for adding delay to signal values received from at least some elements of an antenna array of the inertial navigation system.

20. The apparatus for determining azimuth as in claim 19 wherein the means for adding delay to signal values further comprises means for adding an incremental delay to signal values from antenna elements along a first axis of the antenna array.

21. The apparatus for determining azimuth as in claim 19 wherein the means for adding delay to signal values further comprises adding an incremental delay to signal values from antenna elements along a second axis of the antenna array.

22. The apparatus for determining azimuth as in claim 19 further comprising means for summing signal values at each steered null position and storing the sum in a signal value table along with indicia of steered null direction.

23. The apparatus for determining azimuth as in claim 22 further comprising means for comparing sums in the signal value table to determine the steered null direction providing the relative minima summed signal value and steered null direction.

24. The apparatus for determining azimuth as in claim 23 further comprising means for setting the direction of the steered null at the relative minima equal to the azimuth of the selected satellite as measured from the determined location.

25. Apparatus for determining azimuth within an inertial navigation system using signals from a constellation of satellites of the global position system where each satellite of the constellation of satellites provides positional information of the satellite, such apparatus comprising:

a cross-correlator which acquires a signal from at least some satellites of the GPS system;

a global position system processor which determines a location of the inertial navigation system from the acquired signals;

an antenna delay processor which steers a null across a selected arc containing a selected satellite of the at least some satellites from which signals were acquired;

a signal level comparator which identifies a direction of the selected arc providing a relative minima in signal level from the selected satellite in response to the steered null; and a correlation processor which determines an azimuth by correlating the identified location of the relative minima with an azimuth of the selected satellite from the perspective of the determined location.

26. The apparatus for determining azimuth as in claim 25 further comprising a decoder processor which decodes almanac/ephemeris data from each acquired satellite signal as provided satellite positional information.

27. The apparatus for determining azimuth as in claim 25 wherein the antenna delay processor which steers a null further comprising a delay processor which adds delay to signal values received from at least some elements of an antenna array of the inertial navigation system.

28. The apparatus for determining azimuth as in claim 27 wherein the delay processor which adds delay to signal values further comprises a first antenna element weighting processor which adds an incremental delay to signal values from antenna elements along a first axis of the antenna array.

29. The apparatus for determining azimuth as in claim 27 wherein the a second antenna element delay processor which adds delay to signal values further comprises adding an incremental delay to signal values from antenna elements along a second axis of the antenna array.

30. The apparatus for determining azimuth as in claim 27 further comprising an accumulator which sums signal values at each steered null position and storing the sum in a signal value table along with indicia of steered null direction.

31. The apparatus for determining azimuth as in claim 30 further comprising a comparator which compares sums in the signal value table to determine the steered null direction providing the relative minima summed signal value and steered null direction.

32. The apparatus for determining azimuth as in claim 31 further comprises a coordinate position processor which sets the direction of the steered null at the relative minima equal to the azimuth of the selected satellite as measured from the determined location.

* * * * *